United States Patent Office 3,300,878
Patented Jan. 31, 1967

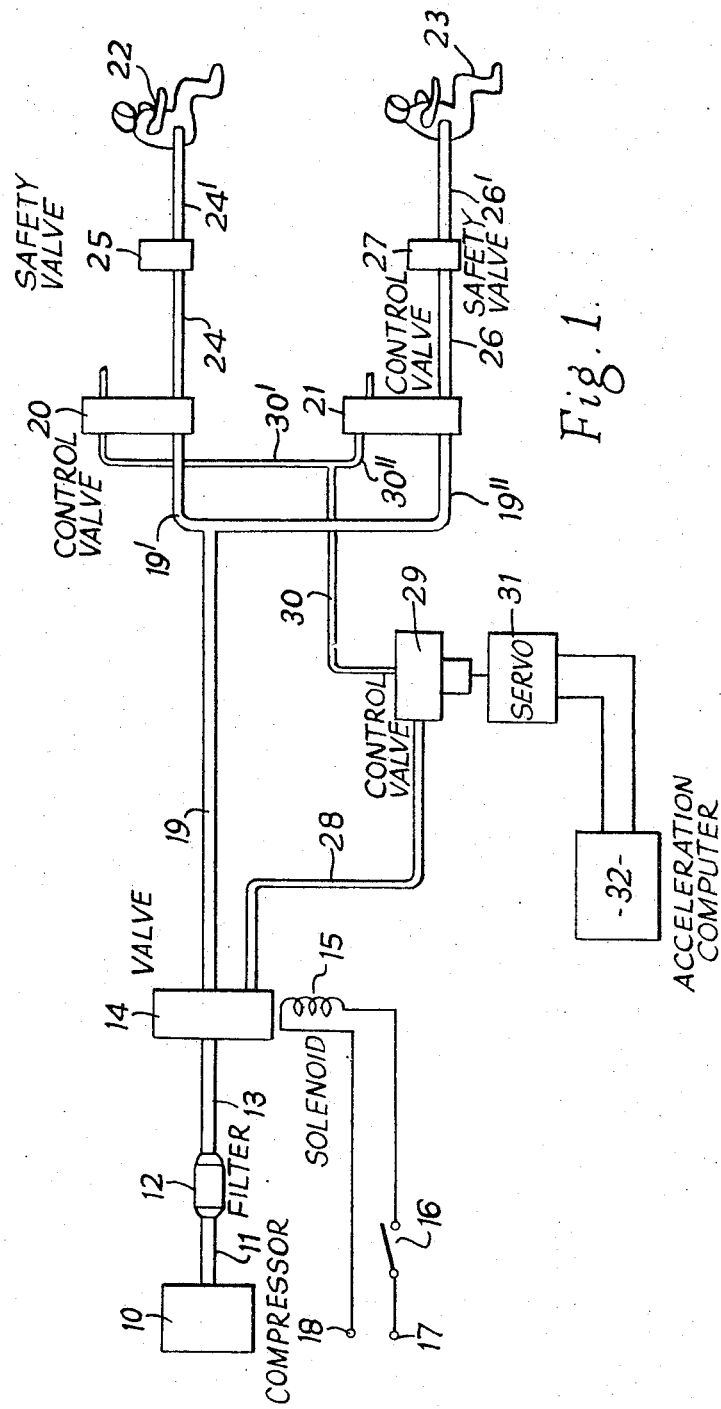

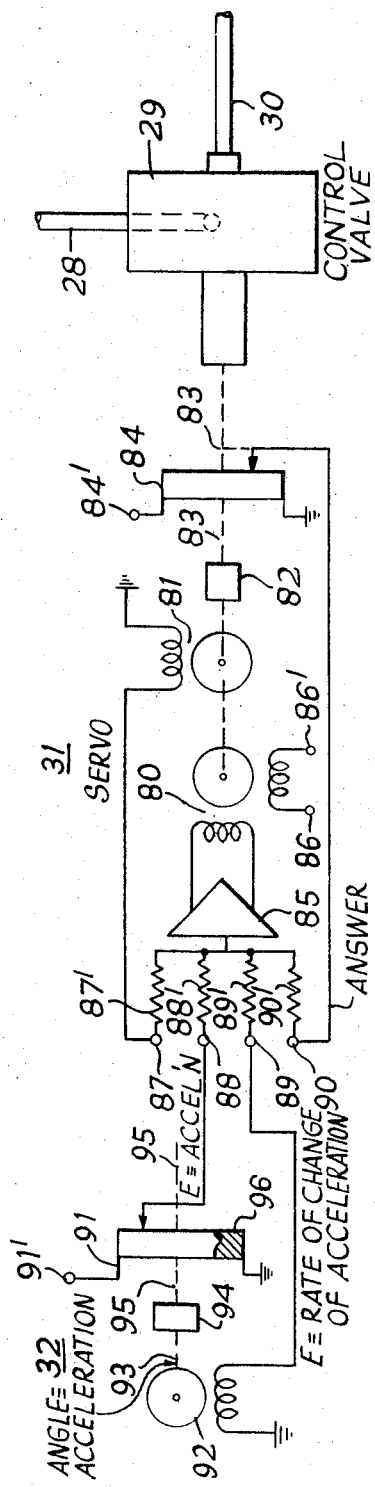

3,300,878
FLIGHT TRAINING APPARATUS
Harold John Butcher, Gillingham, Kent, and Frank Horace Pitts, Ifield, Crawley, England, assignors to Communications Patents Limited
Filed Dec. 19, 1963, Ser. No. 331,879
Claims priority, application Great Britain, Jan. 11, 1963, 1,347/63
4 Claims. (Cl. 35—12)

This invention relates to ground based flight training apparatus and more particularly to ground based flight training apparatus for high speed aircraft of the kind in which the flying personnel are equipped with inflatable wearing apparel.

In high speed aircraft, the accelerations which occur when making tight turns or on pulling out of steep dives are many times greater than the acceleration g due to gravity. As a result of these accelerations, the crew of the aircraft are subjected to forces of a magnitude and in a direction to reduce the flow of blood to the head and upper part of the body. This reduced flow of blood causes undue fatigue and in some instances temporary insensibility.

To offset these effects, it is customary to equip the crews of high speed aircraft with inflatable garments, generally referred to as "anti-G suits." The suits incorporate bladders, arranged to bear against areas of the body of the wearer, which are inflated with compressed air according to the magnitude of the accelerations, so that pressure is applied to the limbs and to the abdomen in such a manner as to reduce the flow of blood from the head and upper parts of the body.

The flow of air to each suit is controlled by a valve which is actuated by a bob-weight, so that the suit is automatically inflated to a pressure which is determined by the accelerations to which the bob-weight of the valve is subjected.

In modern flight training, use is made of flight simulators in which the responses of an aircraft's instruments to the settings of the pilot's or an instructor's controls and many other effects are simulated as faithfully as possible throughout the whole of a simulated flight exercise. In flight simulators for high speed aircraft, it is desirable that the crew undergoing training should wear "anti-G suits" of the kind used in actual flying operations, in order that an exercise may be carried out under conditions of maximum realism.

In known flight training apparatus, facilities have been provided for connecting the suits to a source of compressed air, the flow of which is varied with the computed accelerations, so that pressure effects are produced on the body similar to those experienced during actual flying. Hitherto, the effects produced in this way have lacked realism, due to poor response of the air flow control system to rapid changes of acceleration, and to irregular control of the air flow.

It is an object of the present invention to provide, in ground-based flight training apparatus, improved servo-operated control systems, whereby the characteristics of airborne valve mechanisms for controlling the flow of air to an inflatable garment, may be more faithfully simulated.

Accordingly, the invention provides ground-based flight training apparatus, including apparatus for simulating physical effects corresponding to those experienced in actual flight by the wearer of an inflatable garment, comprising at least one remotely-controlled valve device for controlling the air supply of an inflatable garment, a control valve for controlling the operation of at least one said remotely-controlled valve device, servo-mechanism for actuating the said control valve, and computing means associated with an acceleration computing system of the flight training apparatus for providing at least one electric signal by which the operation of the said servo-mechanism is controlled.

One form of the invention provides ground-based flight training apparatus, as defined in the previous paragraph in which the said servo-mechanism is controlled by more than one electric signal and one of the said electric signals is a rate of change of acceleration signal.

The control valve for controlling the operation of the remotely-controlled valve and the remotely-controlled valve itself may be electro-mechanical devices or hydraulic devices but it is considered to be most convenient for these valve devices to be pneumatic.

In order that the invention may be readily carried into effect, one embodiment thereof will now be described in detail, by way of example, with reference to the accompanying drawings, in which:

FIG. 1 is a block diagram of a pneumatic system for simulating the operation of the anti-G suits of the pilot and the co-pilot of a flight training apparatus;

FIG. 3 is a block diagram of a servo-actuated valve controlling the operation of two valves of the form of FIG. 2.

Figure 4:
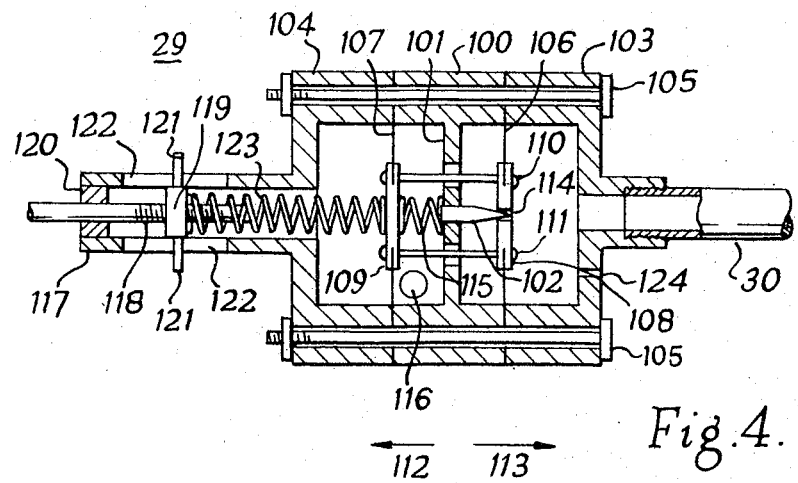
FIG. 4 is a simplified sectional diagram of the servo actuated valve of FIG. 3.

In actual aircraft, the air supply for the crew's anti-G suits is stored, at high pressure, in steel bottles and is fed to each suit through a separate valve. Each valve is actuated by acceleration forces to control the flow of air to the suit with which it is associated.

In ground-based flight training apparatus, a motor-driven air compressor is used, so as to avoid the inconvenience of changing air bottles at intervals between exercises and also to reduce the risk of accident attendant upon the use of equipment employing air at high pressure. The suits are inflated to a maximum pressure less than that employed in actual flight, for example half the actual value, because in simulated flight the crew are not subjected to the high accelerations of actual flight. Therefore, the suit is not required to control the blood flow of the personnel undergoing training but merely to produce the corresponding sensory effects.

Referring to FIG. 1, a motor-driven air compressor 10 is connected by a pipe 11 to a filter 12 and thence by a pipe 13 to an isolating valve 14. The valve 14 is actuated by a solenoid 15, which is fed with direct current through switch 16, from a source of supply, not shown, connected to terminals 17 and 18.

With the switch 16 in a closed position, air is fed by way of pipes 19, 19' and 19" to remotely-controlled valves 20 and 21. The valve 20 controls the supply of air fed to a pilot's anti-G suit 22 and the valve 21 controls the supply of air fed to a co-pilot's anti-G suit 23.

Air is fed from the valve 20 to the suit 22, by way of pipes 24 and 24', through a safety valve 25. Air is fed from the valve 21 to the suit 23 by way of pipes 26 and 26', through a safety valve 27.

With the switch 16 in a closed position, air is also fed from the valve 14, by way of pipe 28, to a control valve 29. Air from the valve 29 is fed by pipes 30, 30' and 30" to pressure-sensitive elements, not shown in FIG. 1, in the valves 20 and 21, so that both valves 20 and 21 are remotely-controlled by the valve 29. The valves 20 and 21 correspond to valves installed in actual aircraft to control the flow of air to the crew's anti-G suits. In this embodiment, each valve is a normal item of aircraft equipment, modified to include a pressure-sensitive element in place of the normal bob-weight. The mechanism of the valves 20 and 21 will be described in detail later in the specification.

The control valve 29 is actuated by a servo-mechanism 31, fed with signals derived from elements of the acceleration computing system of the flight simulator, indicated in the diagram by the unit 32. The servo-mechanism 31 and the mechanism of the control valve 29 will be described in detail later in the specification.

Figure 2:
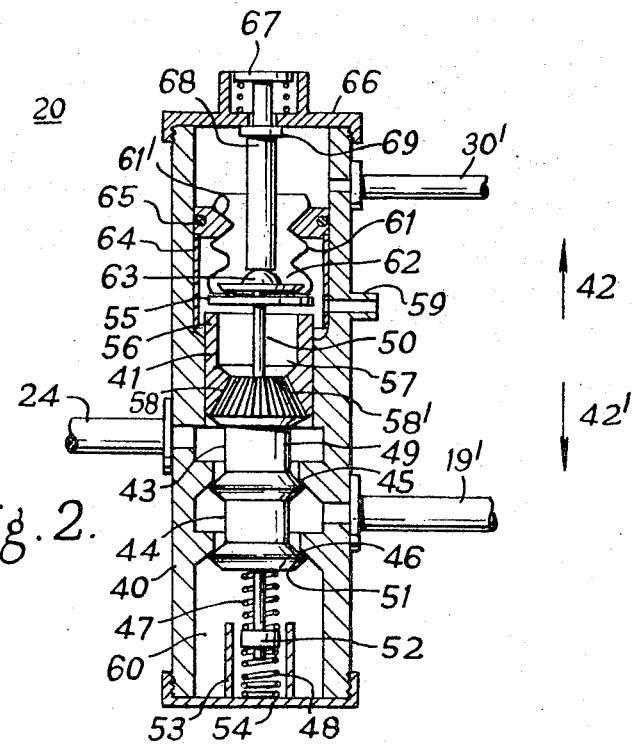
FIG. 2 is a simplified sectional diagram of a valve for controlling the flow of air to one of the anti-G suits of the system.

The mechanism of the valve 20 controlling the flow of air to the pilot's suit 22, is shown in FIG. 2. The valve and the inlet and outlet pipes are indicated by the same references as in FIG. 1.

Referring now to FIG. 2, the valve shown generally at 20, has a hollow cylindrical body 40, in which a piston 41 is mounted to move to and fro in the direction of the arrows 42 and 42', so as to control the flow of air from the pipe 19' to the pilot's anti-G suit connected to pipe 24.

The piston 41 has two shallow circumferential grooves 43 and 44, which are positioned to be opposite inlet and outlet ports of the valve, where the pipes 19' and 24 are attached to the body 40. Walls of the grooves 43 and 44 co-operate respectively with annular surfaces 45 and 46 of conical form, on shoulders within the body 40, to provide the movable members and seats of two sections of the valve. The walls of the grooves 43 and 44 and the surfaces 45 and 46 on the shoulders are maintained in contact by helical springs 47 and 48 to close the two sections of the valve.

The piston is provided with an axial hole 49, through which a rod 50 passes freely and upon which the spring 47 is mounted. The spring 47 is maintained in a state of compression between an end face 51 of the piston and a collar 52, attached to one extremity of the rod 50. The spring 48 is housed in a retaining tube 53, attached to a cap 54, by which one end of the body 40 is closed. The spring 48 is maintained in a state of compression between the collar 52 and the cap 54.

Attached to the other extremity of the rod 50 is a disc 55, which co-operates with an annular end-face 56 of the piston 41, formed by an axial recess 57 bored in the piston. Holes 58, 58' are provided between the groove 43 and recess 57, so that air is able to escape from the suit via a port 59, unless the disc 55 and end face 56 of the piston are in intimate contact.

For airborne use, the rod 50 and the disc 55 are attached to a bob-weight. In an actual aircraft, the valve is mounted with its body axis parallel to the Z axis of the aircraft, so that the bob-weight moves in the direction of the arrow 42' as a result of the acceleration forces acting in a downwards direction relative to the pilot of the aircraft.

For accelerations of less than 1½ g, the spring 48 is compressed by an amount which is insufficient to enable the disc 55 to come into contact with the end face 56 of the piston. The piston is maintained, by spring 47, in a position where the two sections of the valve are closed, so that no air is passed to the pilot's suit by way of pipe 24.

For accelerations in excess of 1½ g, the spring 48 is compressed, so that the recess 57 is closed by the disc 55, the piston is moved in the direction of the arrow 42' and the two sections of the valve are opened. With the valve sections open, air is admitted to the suit by way of pipe 24. Air is also admitted to a space 60 between the end 51 of the piston and the end cap 54 until the force exerted on the piston by the pressure of air in the space 60 and in the suit balances the force exerted by the bob-weight and the valve sections are again closed.

If the acceleration is reduced to 1½ g or less the disc 55 no longer makes contact with the end face 56 and air escapes by way of ports 58, 58' and 59 until the pressure in the suit is restored to normal.

The mechanism so far described corresponds to that of normal airborne equipment. For simulator use, the bob-weight is replaced by a bellows 61, made of flexible plastic material, for example synthetic rubber. The bellows, which is of circular cross-section, is closed at one end by the disc 55, to which an annular portion of the wall of the bellows is clamped under a washer 62, by a nut 63 carried by the rod 50. The other end of the bellows is open. A fold 61' of the bellows is retained under pressure by the rim of a sleeve 64 in which is accommodated a sealing ring 65. The sleeve is mounted within the body 40, in the space normally occupied by the bob-weight, so that the space is separated, by the wall of the bellows, into two compartments between which air cannot pass.

The upper part of the body 40, in which the bellows and sleeve assembly is accommodated, is closed by a cap 66. The cap 66 is provided with a spring-loaded button 67, which is a test button by which the correct operation of the system may be verified manually. The button is coupled to a rod 68, so that the valve sections are opened if the test button 67 is depressed. A sealing washer 69, of plastic material, prevents air from escaping, by way of the button, during normal operation of the valve.

The upper part of the body 40 is supplied with air from the control valve 29 of FIG. 1 by way of pipe 30'. Air from the control valve 29 produces variations of air pressure within the bellows. If these air pressure variations are in direct proportion to the simulated accelerations, the valve operates in a manner analogous to the airborne counterpart incorporating the bob-weight.

Referring now to FIG. 3, the control valve, servo-mechanism and part of the acceleration computing system of the flight simulator have the reference numbers 29, 31 and 32 respectively, as in FIG. 1.

In the servo-mechanism, shown generally at 31, the output shaft of a two-phase motor 80 is coupled to the rotor of a feedback generator 81 and to the input of a speed reduction gear 82.

An output shaft 83 of the speed reduction gear is coupled to the input of a potentiometer 84 and to mechanism of the control valve 29, to be described later in this specification. Alternating current is fed to the winding of potentiometer 84 from a source of supply, not shown, connected to terminal 84'.

One winding of the motor 80 is fed with current from the output of an amplifier 85; the other winding is fed with current from a quadrature source of supply, not shown, conected to terminals 86 and 86'.

Signals are fed to terminals 87, 88, 89 and 90 and to the input of amplifier 85 by way of summing resistors 87', 88', 89' and 90' respectively. The signals fed to terminals 88 and 89 are derived from the wiper of a potentiometer 91 and from the output winding of a generator 92. The potentiometer 91 and the generator 92 are elements of the computing servo, indicated generally at 32, of which part only is shown in the drawing. The rotor of generator 92 and the wiper of potentiometer 91 are coupled to input and output shafts 93 and 95 respectively of a speed reduction gear 94. The shaft 93 is coupled to the shaft of the servo motor, not shown, by which the computing servo 32 is actuated. As already stated, this servo is part of the acceleration computing system of the flight simulator and includes means, not shown, by which the acceleration instruments of the simulator are operated.

The servo 32 is fed with signals generated in the computer of the simulator. The nature of these signals is such that the angular position of the shaft 95 corresponds, at any instant of time during an exercise, to the computed value of the acceleration. The winding of potentiometer 91 is fed with alternating current from a source of supply, not shown, connected to terminal 91', and part of its winding, indicated by the reference number 96, is shorted out. The wiper is set to a position on the shaft 95 such that a signal voltage is fed to terminal 88 if the value of computed acceleration is 1½ g or more. The potentiometer has a linear law, hence the signal voltage is directly proportional to computed acceleration for values of acceleration exceeding 1½ g.

An "answer" voltage is fed to terminal 90 from the wiper of potentiometer 84, so that the shaft 83 takes up a position corresponding to the value of acceleration represented by the signal voltage fed to terminal 88. Stabilising rate feed-back is fed to terminal 87 from the winding of the feedback generator 81.

A voltage derived from the winding of generator 92, corresponding to the rate of change of acceleration, is fed to terminal 89 whenever a manoeuvre is carried out in which a non-uniform acceleration occurs. The sense of this voltage and the values of summing resistors 88' and 89' are such that the speed of response of the servo 31 is enhanced. In this way, the pressure variations produced by the control valve 29 are made to correspond to the acceleration signal variations computed in the simulator and the inertial characteristics of the bob-weight of an airborne valve controlling the flow of air to an anti-G suit are realistically simulated.

This latter is a desirable feature where simulated manoeuvres are carried out involving rapid changes of acceleration, in order that the inflations and deflations of the suits may correspond to the readings of the acceleration instruments and to the manipulation of the flying controls.

The control valve 29 is shown in detail in FIG. 4. In the figure, the valve has a hollow cylindrical body 100 with an internal shelf 101 in which is located a pointed rod 102, forming the needle of a needle valve. The body of the valve is closed by end caps 103 and 104, which are attached to the body 100, by bolts and nuts 105. Flexible annular diaphragms 106 and 107 have their outer edges clamped between the end caps 103 and 104 respectively and the body 100.

To the inner edges of diaphragms 106 and 107 are attached metal discs 108 and 109 respectively, coupled together by tie rods 110 and 111, which pass through clearance holes in the shelf 101 to allow the faces of the discs 108 and 109 to move to and fro in the direction of the arrows 112 and 113. The disc 108 is provided with a hole 114 at its centre and forms the valve seat into which the pointed end of the rod 102 protrudes. The disc 109 is urged to move in the direction of the arrow 112, to tend to close the needle valve, by a light helical spring 115 mounted between one face of the disc 109 and the shelf 101.

Air is supplied to a compartment between the diaphragms 106 and 107, enclosing the shelf 101, by way of port 116, to which the pipe 28, FIG. 3, is connected. With the needle valve open, air is passed to an outlet compartment between the diaphragm 106 and the end cap 103 to which the outlet pipe 30 is connected.

The end cap 104 has a tubular extension 117, in which a lead screw 118 and an associated nut 119 are supported by a bearing 120. The nut is provided with dowel pins 121 which co-operate with slots 122 in the extension 117, so that the nut 119 moves to and fro in the direction of the arrows 112 and 113 when the lead screw is rotated in the clockwise and counter-clockwise directions respectively. A helical spring 123, mounted between the nut 119 and the disc 109, is compressed when the lead screw is rotated in a counter-clockwise direction.

The shaft of the lead screw 118 is coupled to the shaft 83 of the servo 31, FIG. 3. The spring 123 is compressed when the shaft 83 is rotated in a counter-clockwise direction, corresponding to an acceleration having a value of 1½ g or more, and force is exerted on the diaphragm 107 in the direction of the arrow 113 to increase the flow of air through the valve. Air is passed to the outlet compartment until the outlet air pressure acting on the diaphragm 106, produces a force in the direction of the arrow 112 of a magnitude to counter-balance the force produced by the compression of spring 123. The flow of air through the needle valve is then reduced to maintain this outlet air pressure.

A constant air leak is provided by a hole 124 in the outlet compartment, so that the valve is maintained in an active condition at all times. This hole also provides an exhaust for the closed pressure system formed by the pipes 30, 30' and 30" and the bellows of the valves 20 and 21 of FIG. 1.

The variations of outlet air pressure of the valve 29 are directly proportional to the forces exerted by the spring 123 on the disc 109, irrespective of variations in the pressure of the air fed to the valve.

The valve 29 is adjusted to provide a steady pressure in the bellows of the valves 20 and 21 of FIG. 1, so that the valves are opened by a relatively small increase of air pressure within the bellows. This ensures that the response of the system to accelerations greater than 1½ g is determined by the servo system and not by the valves.

For accelerations greater than 1½ g, the pressure developed by the air in the bladders of the anti-G suits is proportional to the air pressure produced by the control valve. As this pressure corresponds, at any instant, to the acceleration value computed by the acceleration system of the flight simulator, the pressure effects produced on the body of the wearer are similar to those experienced in actual flying operations.

In an alternative arrangement, the control valve is actuated by a torque motor or like device in which angular displacement is determined by the D.C. current fed to the input. The coils of the device are fed with current from a rectifier connected to the output of an amplifier similar to the amplifier 85 of FIG. 3. The amplifier is fed with acceleration and rate of change of acceleration signals, derived from the acceleration system of the flight simulator, in the manner already described.

What we claim is:

1. Ground-based flight training apparatus including apparatus for simulating physical effects corresponding to those experienced in actual flight by the wearer of an inflatable garment, comprising at least one inflatable garment, means for supplying air under pressure to the garment, one remotely-controlled valve device including pressure sensitive means for controlling the supply of air to the inflatable garment, a control valve for controlling the operation of the said pressure sensitive means, a servo-mechanism for actuating the said control valve, and computing means associated with an acceleration computing system of the flight training apparatus, said computer means including a generator means for generating a first signal proportional to the rate of change of acceleration and a means for generating a second signal proportional to acceleration, and said servo-mechanism including a means for combining the first two signals to create a third signal, and means within said servo-mechanism for responding to the said third signal to actuate the said control valve, so that the pressure variations at the said pressure sensitive means derived from the control valve corresponds to the acceleration and rate of change of acceleration signals generated by the said computer.

2. Ground-based flight training apparatus as claimed in claim 1 in which the said means for combining the first two signals includes a summing amplifier.

3. Ground-based flight training apparatus as claimed in claim 1 including a plurality of said inflatable garments, a remotely-controlled valve device for each garment, and a single control valve for controlling the plurality of remotely-controlled valve devices.

4. Ground-based flight training apparatus as claimed in claim 1 in which the said control valve is a servo actuated pneumatic control valve and the remotely-controlled valve device is a pneumatically actuated control valve device.

References Cited by the Examiner

UNITED STATES PATENTS

| 1,301,003 | 7/1962 | Helmore | 35—12 |
| 3,097,436 | 7/1963 | Gaucher | 35—12 |

FOREIGN PATENTS 918,705   2/1963   Great Britain.

EUGENE R. CAPOZIO, *Primary Examiner.*

R. E. KLEIN, *Assistant Examiner.*